United States Patent [19]

Wycoff

[11] 4,019,142
[45] Apr. 19, 1977

[54] SELECTIVELY CALLABLE RECEIVER OPERATED IN ACCORDANCE WITH TONE CHARACTERISTICS

[76] Inventor: Keith H. Wycoff, 1205 N. Tyler St., Lexington, Nebr. 68850

[22] Filed: Aug. 16, 1974

[21] Appl. No.: 498,172

[52] U.S. Cl. .............................. 325/392; 325/466; 340/171 PF
[51] Int. Cl.² .......................................... H04J 3/12
[58] Field of Search ............ 325/466, 492, 64, 364, 325/325, 455, 55, 392; 340/171 R, 167 A, 171 PF, 171 R, 311, 312, 168 R

[56] References Cited

UNITED STATES PATENTS

| | | | |
|---|---|---|---|
| 3,577,080 | 5/1971 | Cannalte | 325/64 |
| 3,597,690 | 8/1971 | Wycoff | 325/64 |
| 3,651,413 | 3/1972 | Wycoff | 325/492 |
| 3,670,242 | 6/1972 | McGarvey | 325/55 |
| 3,701,024 | 10/1972 | Knowles | 325/466 |
| 3,774,114 | 11/1973 | Dahlgren | 325/466 |
| 3,803,429 | 4/1974 | Wieczorek | 325/466 |
| 3,806,938 | 4/1974 | Zegarski et al. | 340/167 R |
| 3,864,674 | 2/1975 | Worsham et al. | 340/171 PF |
| 3,868,639 | 2/1975 | Okada et al. | 340/167 A |
| 3,882,466 | 5/1975 | Poorvin | 340/311 |

Primary Examiner—Benedict V. Safourek
Attorney, Agent, or Firm—Prangley, Dithmar, Vogel, Sandler & Stotland

[57] ABSTRACT

The receiver includes a decoder responsive to certain characteristics of a coded signal, such as the frequency of tones, for producing a decoded signal indicative of second characteristics of the coded signal, such as the durations of the tones. A duration detector is responsive to the decoded signal to provide a detected signal having properties indicative of the tone duration. A utilization circuit is coupled to the detector and is operated in accordance with the properties of the detected signal. The utilization circuit may be an annunciator which produces an audible or visual alerting signal, or it may express digital information, or it may be a system which is to be remotely controlled. Such receiver may be one in a system of various groups of receivers which can be contacted simultaneously if desired. Also, the receiver may include audio circuitry to provide a voice message in the presence of a predetermined detected signal, and alerting means to provide an alerting signal in response to a different detected signal.

47 Claims, 13 Drawing Figures

SELECTIVELY CALLABLE RECEIVER OPERATED IN ACCORDANCE WITH TONE CHARACTERISTICS

BACKGROUND OF THE INVENTION

A selective call communication system comprises a transmitter and a number of receivers. Each receiver is adapted to intercept the same carrier wave frequency, but is responsive to a predetermined tone or set of tones. Present systems on the market are two basic types. In one type, the receivers are not capable of reproducing a voice message, but rather produce an audible or visual alerting signal. In such a system, a given receiver will emit an alerting signal when the carrier wave is modulated with the tone or tones associated with that receiver. The possessor of such a receiver will then perform some previously agreed upon action such as calling his office. Different tones or sets of tones modulated on that carrier wave will activate other receivers. The other type of system enables voice communication. The audio circuitry in each receiver is squelched until the associated tone or set of tones is received. Then, the receiver becomes unsquelched to reproduce the ensuing voice message.

The advantage of a system in which the selected receiver emits an alerting signal is that many communications can occur in a given time period since each communication is essentially momentary. In a system which contemplates voice communication, much more "air time" is consumed in transmitting such messages. However, a system in which the receivers emit only alerting signals suffers the disadvantage of not being capable of voice communication in certain instances when that is necessary.

A further disadvantage of presently available systems in which the receivers furnish an alerting signal is that only one piece of information can thereby be conveyed. In other words, only a single previously agreed-upon action can be taken by the bearer of the receiver when he perceives an alerting signal.

Some presently available selective call communication systems have what is commonly referred to as a "group-call" feature, which enables simultaneous communication with a group of receivers. It has also been proposed that each receiver be a member of more than one group, for example, a member of a group of 10 and a member of a group of 100. Then, depending upon the situation, a signal can be sent to all receivers in the group of 10, or to all receivers in the group of 100. However, such proposals do not call for means to apprise the bearer of such receiver whether a group is receiving the page, and which group is receiving the page.

SUMMARY OF THE INVENTION

It is therefore an important object of the present invention to conserve "air time" used by a selective call communication system.

Another object is to provide an improved apparatus to communicate information to selected receivers in a selective call communication system.

Still another object is to provide a selective call communication system in which digital information is transmitted to selected receivers.

Yet another object is to increase the quantity of information which can be modulated on a carrier wave transmitted to selectively callable receivers.

A further object is to provide a selective call communication system in which a receiver is selected by transmitting a tone signal of predetermined frequency characteristics, and information is communicated to such receiver by providing the tone signals with predetermined duration characteristics.

A still further object is to provide a selective call communication system in which a receiver is selected by transmitting a tone signal of predetermined frequency characteristics, and provides a plurality of outputs in accordance with the duration characteristics of the tone signal, such outputs being used remotely to control a utilization means.

A yet further object is to provide a selective call communication system which includes receivers having one mode of operation by which an alerting signal is furnished and another mode of operation by which a voice message is furnished.

In connection with the foregoing objects, it is another object to enable selection of a receiver by using a tone signal of predetermined frequency characteristics and to operate the receiver in one of its two modes by providing the tone signal with predetermined duration characteristics.

Still another object is to provide a selective call communication system in which a selected receiver or a selected group of receivers can be caused to furnish either an alerting signal or a voice message.

Yet another object is to provide a selective call communication system in which a selected receiver or a selected group of receivers can be caused to express digital information transmitted thereto.

It is a further object to provide a selective call receiver adapted to display a telephone number which the possessor of the receiver is to call.

In connection with the foregoing objects, it is a further object to enable contact with receiver groups of various sizes and identify to the bearer of each receiver the group being contacted.

A still further object is to conserve air time by providing a selective call communication system in which the transmitted signal can be brief to cause a selectively callable receiver to produce an alerting signal and thereby apprise the bearer of such receiver that he is to perform a prearranged act, or, if desired, the transmitted signal can cause such receiver to reproduce a voice message.

A yet further object is to provide a selectively callable receiver which is rendered operative by a coded signal having certain predetermined characteristics, such as a sequence of tones of predetermined frequency, and furnishes an output or renders an annunciator operative in accordance with other predetermined characteristics of the coded signal, such as the durations of tones in such coded signal.

In summary, there is provided a selectively callable receiver having means to furnish a coded signal, such as a tone, the combination comprising a decoder responsive to a coded signal having a predetermined characteristic, such as frequency, for producing a decoded signal indicative of a second characteristic of the coded signal, such as the duration of the tone, a duration detector coupled to the decoder and responsive to the decoded signal for providing a detected signal having properties indicative of the duration of the tone, and an annunciator coupled to the detector for expressing information in accordance with the properties of the detected signal.

In another form of the invention, the selectively callable receiver has means to furnish a coded signal, such as a tone, followed in certain instances by an audio message, the combination comprising a decoder responsive to a coded signal having a predetermined characteristic, such as frequency, for producing a decoded signal indicative of a second characteristic of the coded signal, such as the duration of the tone, a duration detector coupled to the decoder and responsive to the decoded signal for producing a detected signal having properties indicative of the duration of the tone, an audio circuit for processing the audio message and converting it into an audible message, the audio circuit being coupled to the detector for being rendered operative only in the presence of a detected signal having predetermined properties, and alerting means coupled to the detector for producing an alerting signal in response to a detected signal having other predetermined properties.

In yet a further form, the selectively callable receiver summarized in the preceding paragraph can also have an annunciator coupled to the detector for expressing information in accordance with predetermined properties of the detected signal.

As a further embellishment, each such form can be provided with a group-call circuit responsive to a detected signal having predetermined properties to provide a group-call signal to operate the annunciator, or the alerting means, or the audio circuitry, as the case may be.

The invention consists of certain novel features and a combination of parts hereinafter fully described, illustrated in the accompanying drawings, and particularly pointed out in the appended claims, it being understood that various changes in the details of the circuitry may be made without departing from the spirit or sacrificing any of the advantages of the invention.

BRIEF DESCRIPTION OF THE DRAWINGS

For the purpose of facilitating an understanding of the invention, there is illustrated in the accompanying drawings preferred embodiments thereof, from an inspection of which, when considered in connection with the following description, the invention, its mode of construction, assembly and operation, and many of its advantages should be readily understood and appreciated.

DETAILED DESCRIPTION OF THE PREFERRED EMBODIMENTS

Figure 1:
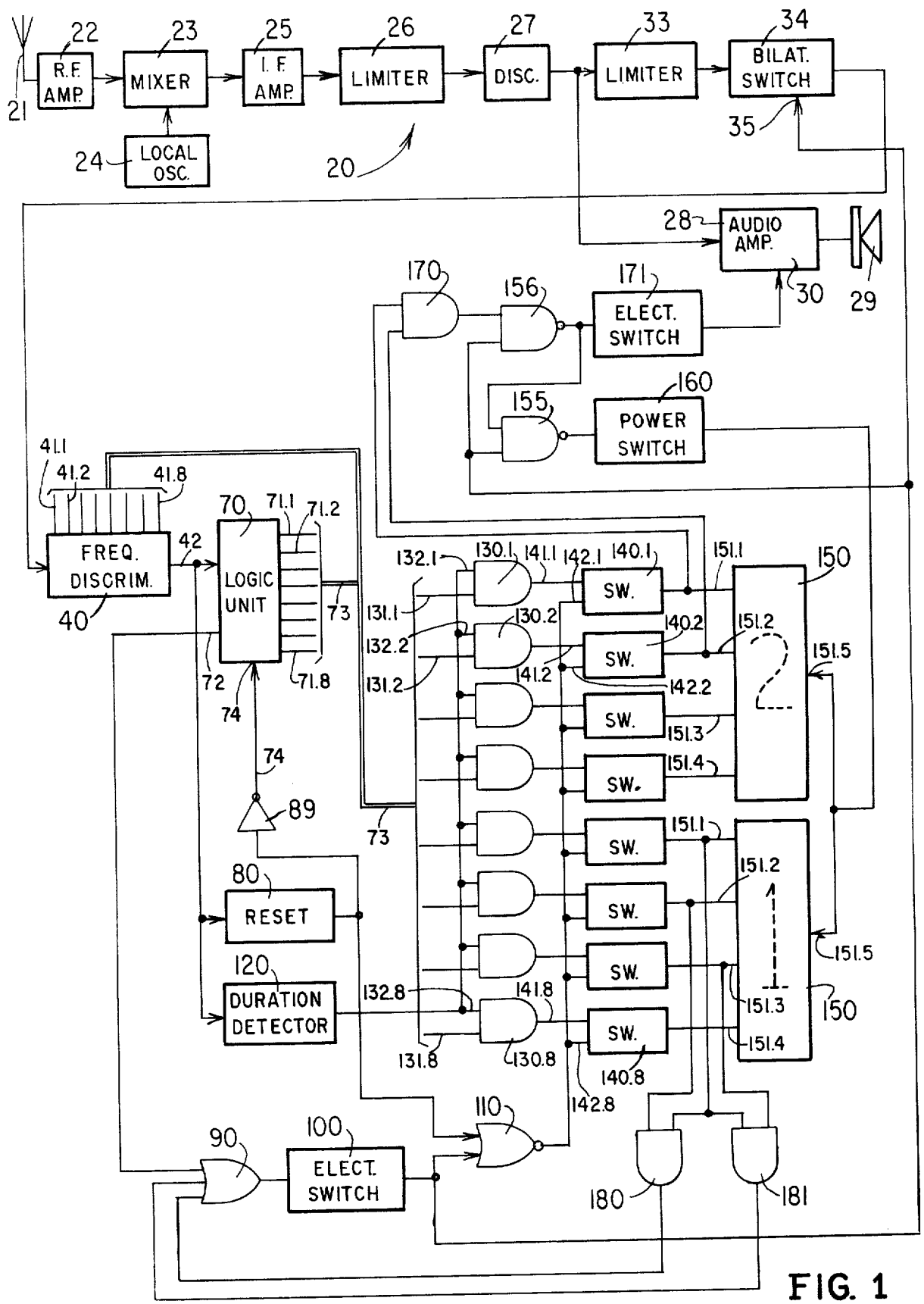
FIG. 1 illustrates a block diagram of a receiver incorporating the features of the present invention.

Referring now to FIG. 1, there is shown a communication receiver made in accordance with and embodying the principles of the present invention, the receiver being generally designated by the numeral 20. The receiver 20 is adapted to receive an RF carrier wave modulated by a sequence of tones alone, or a sequence of tones followed by an audio message. The transmissions are intercepted by an antenna 21 and are conveyed to the input of an RF amplifier 22, which amplifies the modulated RF carrier wave and applies it to a mixer 23. A local oscillator 24 is also connected to the mixer 23 and applies thereto a fixed-frequency oscillatory signal that mixes with the modulated RF carrier wave from the amplifier 22 to provide an IF signal, which is applied to and amplified by an IF amplifier 25. The IF signal is then amplified to limiting by a limiter 26. The limited IF signal is applied to a discriminator 27, which demodulates the modulated IF signal to furnish a sequence of tones alone or a sequence of tones followed by an audio message, as the case may be. The modulated signal from the discriminator 27 is applied to an audio amplifier 28, wherein the audio signal is amplified and applied to a loudspeaker 29 which reconverts the audio message into sound waves. The audio amplifier 28 has associated therewith squelch circuitry represented by a winding 30 which is part of a relay not otherwise shown. When no current is supplied to the winding 30, the audio amplifier 28 is inoperative or squelched, to isolate signals applied thereto from the loudspeaker 29. On the other hand, when current is delivered to the winding 30, the audio amplifier 28 becomes unsquelched, and any audio signals applied thereto are amplified thereby and delivered to the loudspeaker 29 for conversion into sound waves.

The demodulated signal from the discriminator 27 is also applied to a limiter 33, which increases the amplitude of the demodulated signal to limiting. The signal from the limiter 33 is applied to a bilateral electronic switch 34, which has a closed condition, to couple signals form the limiter 33 to a frequency discriminator 40, and an open condition to isolate the signals from the frequency discriminator 40. The bilateral switch 34 has a control input 35, the connection to which will be described in detail hereinafter. The bilateral switch 34 may include one of the four elements of a device made by Motorola, Inc. under its designation MC14016. The bilateral switch 34 also includes an inverter to reverse the polarity of the voltage at the control input 35, prior to application to such one element.

The frequency discriminator 40, along with a logic unit 70, functions as a decoder to evaluate the sequence of tones and to determine whether their frequencies and order are those to which such decoder is arranged to respond. Usually, each receiver in a selective call communication system has a decoder which responds to a certain sequence of tones, and no other receiver in the system has a decoder which responds to the same sequence. Thus, a certain sequence of tones will activate but one receiver in the entire system. For purposes of this disclosure, it is assumed that the decoder will respond to a sequence of eight tones. If each tone is selected from a group of ten frequencies and no tone is repeated in a sequence, there will be 47,829,690 ($10 \times 9^7$) possible tone sequences, and thus, that many receivers could be individually contacted.

The frequency discriminator 40 has a set of eight control inputs 41.1–41.8, corresponding to the number of tones in the sequence. The frequency discriminator 40 includes a filter which has, for example, eight resonant frequencies. If a control signal appears at the first control input 41.1, such filter will be tuned to a first resonant frequency. If, while so tuned, a tone having such frequency is applied to the frequency discriminator 40, a negative pulse will appear on the output 42 of the discriminator 40. Upon termination of the first tone, a control signal appears on the control input 41.2 to tune the filter in the discriminator 40 to a second resonant frequency. A tone, having such second resonant frequency applied to the frequency discriminator 40, will cause a pulse to appear on the output 42 having a duration representative of the duration of such tone. Similarly, control signals at each of the other control inputs 43.3–43.8 respectively tune the filter in the discriminator 40 to corresponding resonant frequencies. If the tone applied to the frequency discriminator 40 has a corresponding frequency, a pulse representative of the tone duration appears on the output 42. As will be explained presently, control signals appear sequentially on the inputs 41.1–41.8, so that the frequency discriminator 40 is operative sequentially to examine a sequence of eight tones applied thereto. If the frequency of each tone corresponds to the resonant frequency of the filter in the frequency discriminator 40, a sequence of eight pulses will appear on the output 42.

The output 42 is coupled to the logic unit 70 which has a set of eight control outputs 71.1–71.8, and an enabling output 72. The logic unit 70 may also be characterized as a stepping switch or counter. Initially, the output 71.1 is high and the other outputs 71.2–71.8 and 72 are low. The terms "high" and "low" are used in the course of this description to identify respectively a high voltage condition and a low voltage condition. The high voltage may be approximately equal to the B+ supply voltage, and the low voltage may be approximately equal to zero volts or ground potential. It is to be recognized, however, that the terms high and low broadly characterize one state versus another state of a switching circuit. In any instance, such states can be reversed.

The outputs 71.1–71.8 and 72 are cyclically rendered high, one at a time, as the logic unit 70 advances by virtue of the train of pulses on the output 42 from the frequency discriminator 40. The outputs 71.1–71.8 are respectively coupled by an eight wire cable 73 to the control inputs 41.1–41.8 of the frequency discriminator 40. The initially high state on the output 71.1 tunes the frequency discriminator 40 to the first resonant frequency. If the first tone has such frequency, the output 42 will become low. Termination of such first tone causes the output 71.2 of the logic unit 70 to become high, causing the control input 41.2 to become high. The frequency discriminator 40 is then tuned to the second resonant frequency, and, if at that time a second tone at that frequency appears, the output of the frequency discriminator 40 again will become low. Termination of such second tone causes the logic unit 70 to step and cause the output 71.3 to become high. This process is repeated for the eight tones. Termination of the eighth tone causes the output 72 to become high. The logic unit 70 has a reset input 74, to which a reset signal is applied to cause the logic unit 70 to return to the initial condition, such that the outputs 71.2–71.8 and 72 become low and the output 71.1 becomes high, preparatory to receiving the next sequence of tones.

The logic unit 70 may be a counter sold by Motorola, Inc. under its No. MC14017 or a counter sold by Solid State Scientific, Inc. under its No. SCL4017A.

The decoded signal on the output 42 of the frequency discriminator 40 is also coupled to a reset circuit 80 which provides a reset signal when the output of the frequency discriminator 40 remains high for a predetermined time. As long as the correct tones are being received in the correct order, no reset signal is generated. However, as soon as the output from the frequency discriminator 40 stays high for a duration longer than that of any of the tones, the reset circuit 80 will cause a reset signal to be generated. The reset signal is reversed in polarity by an inverter 89 and is coupled to the reset input 74 of the logic unit 70 to reset same, preparatory to another sequence of tones.

The output of the reset circuit 80 is normally low, which constitutes the reset signal to condition the logic unit 70 to process a tone sequence. Shortly after commencement of the correct first tone, the output of the reset circuit 80 becomes high and remains high as long as the correct tones are being received in the correct order and for a predetermined period of time thereafter. After such period of time has lapsed, the output of the reset circuit 80 again becomes low, thereby resetting the logic unit 70.

It is contemplated that the durations of the tones, and thus the durations of the pulses on the output 42, will be varied to supply information to the receiver in the manner to be described hereinafter. In this embodiment, each tone has one of two durations which, for the sake of identification, will be characterized as "short" or "long". The duration of the low state on the output 42 will be characterized as short when in response to a tone of short duration, and will be characterized as long when in response to a tone of long duration.

The parameters of the reset circuit 80 are selected to cause the reset time, that is, the time for the output of the reset circuit 80 to become low after termination of the tones, to exceed the duration of the long tone. For example, if the long tone has a duration of 40 ms (milliseconds), the reset time could be set for 50 ms.

The enabling output 72 of the logic unit 70 is coupled to one of three inputs of an OR gate 90, the output of which OR gate is coupled to an electronic switch 100 having timing means therein. The high state of the output 72, on termination of the eighth tone, causes the output of the Or gate 90 also to become high, which closes the electronic switch 100 and causes its output to become high. The electronic switch 100 may include timing means, so that the output thereof remains high for a predetermined limited duration after termination of the eighth tone and the output 72 reverts to its low state. Alternately, the electronic switch 100 can include latching means to cause the output thereof to latch in its high state. In that case, the electronic switch 100 would also include a reset switch which, when operated, causes the output to return to its low state.

The output of the electronic switch 100 is also coupled to the control input 35 of the bilateral switch 34. The output of the electronic switch 100 becomes high upon termination of the last tone, and opens the bilateral switch 34 to prevent further tone sequences from being applied to the frequency discriminator 40. After the predetermined time has lapsed, as established by the timing means in the electronic switch 100, the output of the electronic switch 100 becomes low, thereby opening the bilateral switch 34, preparatory to a subsequent tone sequence.

The output of the electronic switch 100 is also coupled as one input to a NOR gate 110, the other input of which NOR gate is derived from the reset circuit 80. The output of the NOR gate 110 is normally high, but will be switched to its low state when either input is high. Thus, upon termination of the last tone, which causes the output 72 to become high, the output of the NOR gate 110 becomes high and remains high for the limited duration determined by the electronic switch 100.

When the output of the reset circuit 80 becomes high, shortly after commencement of the first tone, the output of the NOR gate 110 becomes low. Although the output of the reset circuit 80 becomes low a predetermined time after termination of the last tone, the output of the NOR gate 110 remains low by virtue of the high input supplied by the electronic switch 100. Thus, the output of the NOR gate 110, which is normally high, will become low shortly after commencement of the first tone and will remain low as long as the correct tones are received in the correct order, and for a predetermined time after termination of the last tone. Such predetermined time is determined by the parameters of the electronic switch 100.

The receiver 20 further comprises a duration detector 120 having its input coupled to the output of the frequency discriminator 40. The duration detector 120 evaluates the duration of each pulse produced by the frequency discriminator 40. The duration detector 120 includes timing means such that the output remains low unless and until a long pulse is applied thereto, to cause the output of the duration detector 120 to become high. In the presence of tones of short duration, the output of the duration detector 120 remains low.

The receiver 20 further comprises a set of eight AND gates 130.1–130.8 respectively having first inputs 131.1–131.8 and second inputs 132.1–132.8. The inputs 131.1–131.8 are respectively coupled to the outputs 71.1–71.8 of the logic unit 70 by way of the cable 73. The second inputs 132.1–132.8 are connected together and to the output of the duration detector 120. As previously described, the outputs 71.1–71.8 sequentially become high respectively during the presence of the eight tones. Thus, during the first tone the input 131.1 is high, during the second tone the input 131.2 is high, etc. If the first tone has a long duration, the output of the duration detector 120, and thus the input 131.1, becomes high. That, along with the input 131.1 being high, causes a high output from the AND gate 130.1. However, if the first tone has a short duration, the input 132.1 remains low, and, despite the input 131.1 being high, the output of the AND gate 130.1 remains low. Similarly, if the fifth tone, for example, had a long duration, the input 132.5 becomes high, while the input 131.5 is high. Accordingly, the output of the AND gate 130.5 becomes high. Thus, high outputs of any of the AND gates 130.1–130.8 are caused by long tones, and low outputs from the AND gates 130.1–130.8 result from short tones.

The receiver 20 further comprises a set of eight bistable switches 140.1–140.8 respectively with "set" inputs 141.1–141.8 and "reset" inputs 142.1–142.8. The set inputs 141.1–141.8 are respectively coupled to the AND gates 130.1–130.8 and the reset inputs 142.1–142.8 are connected together and to the output of the NOR gate 110. The output of each of the switches 140.1–140.8 is normally low and is switched to its high state only when its set input is high and its reset input is low. Once an output of any of the switches 140.1–140.8 becomes high, it will not revert to its low state until its associated one of the reset inputs 142.1–142.8 becomes high. Thus, during the presence of a long tone, the output of the associated one of the switches 140.1–140.8 becomes high, and remains high until the output of the NOR gate 110 becomes high, which, in turn, occurs when the timing means in the electronic switch 100 "times out".

The switches 140.1–140.8 are coupled to a pair of identical display devices 150, which functions as annunciators to express information in accordance with the properties of signals applied thereto. Each device has a set of four control inputs 151.1–151.4, a power input 151.5, and other inputs, such as ground, which are not shown. The display devices 150 may be, for example, a hexadecimal indicator No. 7340 made by Hewlett Packard. With power supplied to the inputs 151.5, the following is a truth table identifying the character displayed in the presence of various combinations of inputs thereto:

| Display | Input 151.1 | Input 151.2 | Input 151.3 | Input 151.4 |
|---|---|---|---|---|
| 0 | L | L | L | L |
| 1 | L | L | L | H |
| 2 | L | L | H | L |
| 3 | L | L | H | H |
| 4 | L | H | L | L |
| 5 | L | H | L | H |
| 6 | L | H | H | L |
| 7 | L | H | H | H |
| 8 | H | L | L | L |
| 9 | H | L | L | H |
| Test | H | L | H | L |
| Blank | H | L | H | H |
| Blank | H | H | L | L |
| Minus sign | H | H | L | H |
| Blank | H | H | H | L |
| Blank | H | H | H | H |

It will be assumed that the top display device 150 displays the first digit and the bottom one displays the second digit. As an example, the first, sixth, seventh, and eighth tones have long durations, and the other four tones have short durations. In such case, the input 151.1 of the first display device 150 will be high, and the other three inputs will be low, so that the digit depicted will be 8. The input 151.1 of the second display device 150 will be low, and the other three inputs will be high, whereby the digit displayed by the second display device 150 will be 7. In that example, the number 87 will be displayed. By appropriately selecting durations of the tones, any number between 00 and 99 may be caused to be displayed.

As will be described hereinafter, power is supplied to the inputs 151.5 of the display devices 150 only after all the tones have been received. Thus, the display devices 150 display the selected number only on the receiver having the decoder responsive to tones of the proper frequency and order.

Each receiver 20 may have affixed thereto a chart apprising the bearer where he is to go, whom he is to call, or of other appropriate action he is to take in response to the numbers displayed on the display devices 150.

Such a system finds broad applications. For example, mechanics in an airport can be supplied with receivers of this character to convey instructions to them as to which gates require their presence. Suppose, for example, a certain airline has 16 gates and 100 mechanics at the airport. Each mechanic is assigned a particular receiver which has a decoder responsive to a set of tones that will not activate any other receivers. By controlling the durations of the tones, any receiver can display any number between 00 and 99. Therefore, if it is desired to have the mechanic with receiver No. 81 go to gate 8, the transmitter is caused to transmit a sequence of tones corresponding to the decoder in receiver No. 8. The durations of those tones are selected to cause the number 08 to be displayed. It is to be noted that the display devices 150 in the receivers carried by the other mechanics will not be illuminated.

Using such a system will conserve air time. For example, if the short tone has a 20-ms duration and the long tone has a 40ms duration, less than 0.3 seconds (not more than six 40-ms tones, plus two 20-ms tones) would be required to transmit the information that a mechanic is to go to a specific gate. Twenty or more such communications can be sequentially sent in the time that it would take to communicate by voice with a voice pager and inform the mechanic that he is to go to gate 15.

The output of the electronic switch 100 is coupled to one input of a NAND gate 155, the second input of which is derived from a NAND gate 156. The output of the electronic switch 100 is normally low, and the output of the NAND gate 156 is normally high, whereby the output of the NAND gate 155 is normally high. The NAND gate 155 is coupled to a power switch 160 which is adapted to supply power to the power inputs 151.5 of the display devices 150. The power switch 160 is inoperative in the presence of the normally high output from the NAND gate 155.

As previously described, the output of the electronic switch 100 becomes high upon termination of the eighth tone, at which time the NAND gate 155 has two high inputs, causing the output to become low, which, in turn, renders the power switch 160 operative to supply power to the display devices 150.

Unless the power switch 160 is closed, following termination of the eighth tone, the display devices 150 will not display any numbers despite the presence of high and/or low inputs thereto.

In certain instances, it is not sufficient to supply a specific receiver with digital information. In those instances, it is desirable to have voice communication with the selected receiver. The audio amplifier 28 is rendered operative in the following manner. The outputs of the first two switches 140.1 and 140.2 are coupled as two inputs to an AND gate 170. The output of the AND gate 170 is coupled as one input of the NAND gate 156, the other input of the NAND gate 156 being provided by the electronic switch 100. The output of the AND gate 170 is normally low, as is the output of the electronic switch 100, whereby the output of the NAND gate 156 is normally high.

If the first two tones have long durations, the outputs of the switches 140.1 and 140.2 will become high, thereby supplying two inputs to the AND gate 170, causing its output to become high. It should be noted that, when the outputs of the switches 140.1 and 140.2 are high, no digit appears on the first display device 150 (see truth table).

The high output from the electronic switch 100, which occurs upon termination of the last tone, together with the high output from the AND gate 170, causes the output of the NAND gate 156 to become low. Such low output is applied to an electronic switch 171, thereby energizing the same and causing current to be supplied to the winding 30 of the squelch circuitry in the audio amplifier 28. The audio amplifier 28 is thereby rendered operative to amplify and process an audio message which follows the tones and is supplied by the discriminator 27.

The low output from the NAND gate 156 prevents the output of the NAND gate 155 from becoming high. Accordingly, when it is desired to conduct a voice communication, the first two tones are sent with long durations, which unsquelch the receiver for the ensuing voice message and prevent power from being supplied to the display devices 150.

A further feature of the receiver 20 is the ability to communicate therewith, along with other receivers in different groups. To that end, there is provided an AND gate 180 having two inputs respectively coupled to the outputs of the switches 140.5 and 140.6. Thus, if the fifth and sixth tones have long durations, the inputs to the AND gate 180 will become high, so that the output of the AND gate 180 becomes high. The output of the AND gate 180 provides a second input to the OR gate 90. The OR gate 90 produces a high output in response to the high output from the AND gate 180. The output of the electronic switch 100 therefore becomes high, causing a high input to be applied to the NAND gates 155 and 156. If the first and second tones also have long durations so as to supply inputs to the AND gate 170, the input to the NAND gate 156 becomes high, which, together with the high input thereto from the electronic switch 100, causes the electronic switch 171 to become energized to unsquelch the receiver. During such time the display devices 150 are de-energized, as previously described. The audio amplifier 28 will be unsquelched, since the fifth and sixth tones have long durations. Because the audio amplifier is unsquelched in response to six tones, 100 receivers responsive to the same six tones will be similarly unsquelched.

Communication with a different group is also possible. A second AND gate 181 has its inputs respectively coupled to the switches 140.5 and 140.7. Thus, if the durations of the fifth and seventh tones are long, the inputs to the AND gate 181 become high, causing the output thereof to become high. The output of the OR gate 90 accordingly becomes high to cause the output of the electronic switch 100 to become high. If the first and second tones also have long durations so as to supply inputs to the AND gate 170, the audio amplifier 28 will be unsquelched in the manner previously described. Because the audio amplifier is unsquelched in response to seven tones, 10 receivers responsive to the same seven tones will be similarly unsquelched.

Alternately, instead of conducting a voice communication, the display devices 150 can be energized instead. In such case, the first and second tones do not have long durations, whereupon the NAND gate 155 will be rendered operative by the high output from the electronic switch 100, thereby supplying power to the display devices 150 in the manner previously described. Also, the long durations of the fifth and sixth tones cause the outputs of the switches 140.5 and 140.6 to become high, as previously described. Referring back to the truth table, the second display device 150 will be blank. The bearer of such receiver, seeing the blank display, will know that he is being paged as a member of one group. On the other hand, if the fifth and seventh tones have long durations, causing the outputs of the switches 140.5 and 140.7 to become high, a test pattern will be displayed by the second display device 150. If the bearer of such receiver is paged and he sees a test pattern on the second display device 150, he knows he is a member of another group, all of whose members are being paged.

It is important to note that a dual-mode receiver capable of voice reproduction or furnishing an alerting signal is possible with the group-call capabilities just described. In other words, by transmitting first and second tones having long durations, the receiver 20 may be placed in its voice mode, whereas, if they do not both have long durations, the receiver 20 will be in its digital-display mode. In the voice mode, the receiver is still capable of being called as one of different groups, but the display devices 150 are not activated in the embodiment depicted. However, suitable modifications may be made to accommodate display of information in the voice mode.

When group call is employed for the non-vice mode, the first display device 150 displays a digit to correspond to the desired information to be related and the second display device 150 is either blank or displays a test pattern indicating which group is being called.

It is to be understood that an eight-tone sequence is merely exemplary. Any number of tones, whether simultaneous or in sequence, is contemplated. In the case of binary-coded signals, four inputs to each display device 150 are necessary in order to be capable of selecting one of 10 decimal digits. Thus, to display two decimal digits as in the embodiment shown, a sequence of eight tones is used. The concept could be expanded to convey to the receiver 20 an entire telephone number which the bearer of such receiver is to call. Suppose the telephone number has seven digits, then a 28-tone sequence would be necessary to convey the telephone number, using four tones for each digit. The bearer of the selectively called receiver would dial the telephone number displayed. Alternately, the number of durations could be increased from two to three or more, in which case, fewer tones would be necessary to supply the information to a selectively called receiver. For seven-digit numbers, seven display devices 150 would be provided, instead of two.

It should also be understood that the receiver 20, although being described as part of an FM communication link, can be part of other type links, such as wires.

Figures 2, 3:
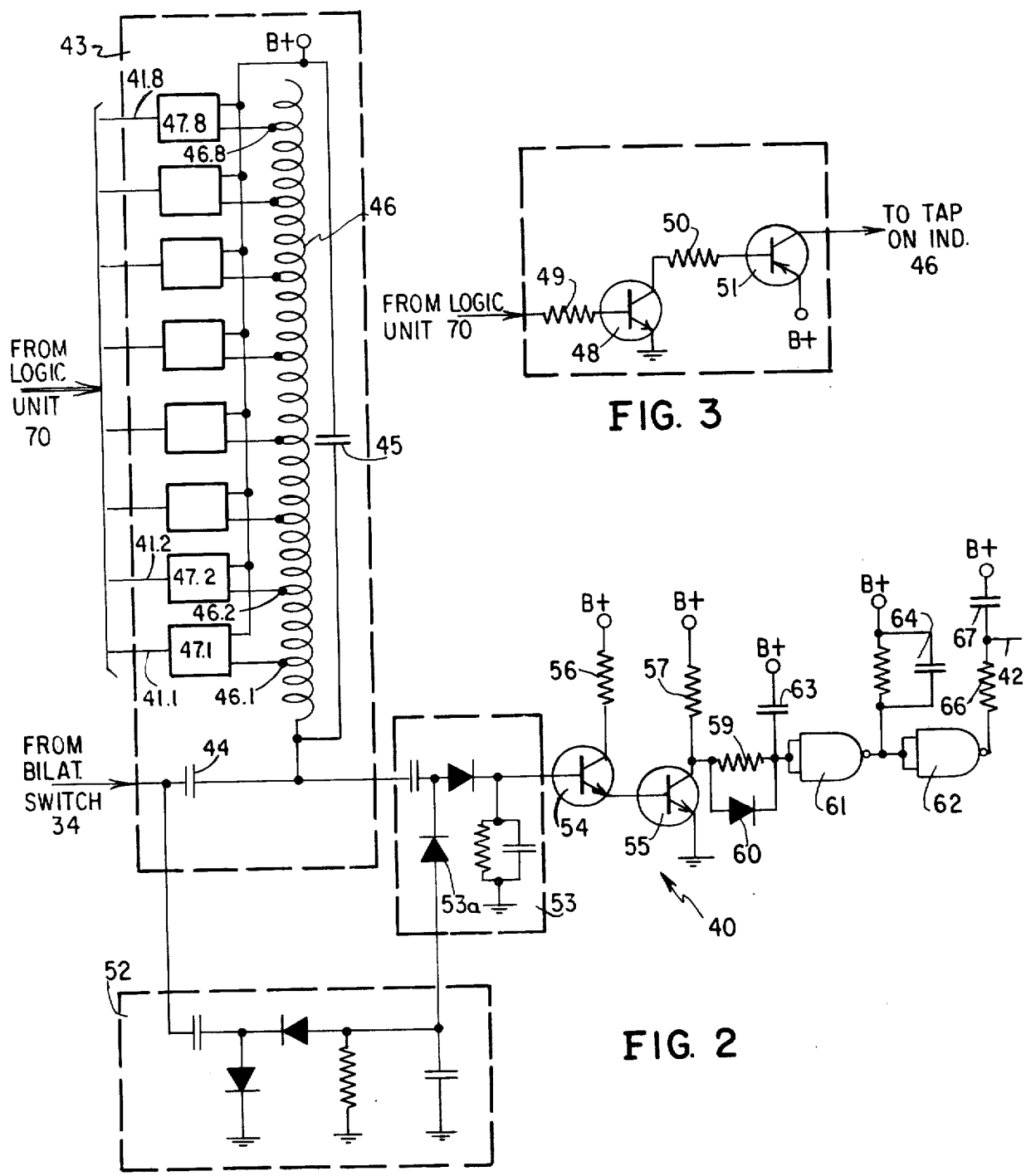
FIG. 2 depicts illustrative circuitry for the frequency discriminator 40 of FIG. 1.
FIG. 3 depicts an illustrative circuit of one of the electronic switches in FIG. 2.

Turning now to FIGS. 2 to 9, exemplary circuits for the various blocks in FIG. 1 will be described. FIG. 2 depicts a representative frequency discriminator 40 which responds to a sequence of eight tones, but which could be readily modified to respond to a single tone or a sequence of any number of tones, as will be clear from the ensuing description. The discriminator 40 includes a resonant circuit 43 which has capacitors 44 and 45, and a tapped inductor 46 having taps 46.1–46.8, only some of which are numbered. The inductor 46 is shown as having eight taps, corresponding to eight different tones in a sequence. However, such inductor may have fewer taps, if tones are repeated, or, more taps so that the same inductor will be usable in all the receivers in the system. The capacitor 44 is coupled in series with the parallel combination of the capacitor 45 and the inductor 46. The frequency discriminator 40 further comprises what is commonly referred to as a doubler circuit 52, which operates in a known manner to rectify and filter an AC voltage, and provides a DC voltage approximately equal to the peak-to-peak amplitude of the AC voltage. The doubler circuit 52 receives and rectifies the sequence of tones and the noise associated therewith, to provide a reference voltage. The discriminator 40 also includes a second doubler circuit 53, the diode 53a of which has its anode connected to receive the reference voltage from the doubler circuit 52. The doubler circuit 53 is connected to a pair of emitter follower NPN transistors 54 and 55 connected in cascade, the collectors of which are coupled to the B+ supply voltage respectively through current limiting resistors 56 and 57. The emitter of the transistor 55 is connected to ground, and its collector is coupled through a resistor 59 to a NAND gate 61. A diode 60 shunts the resistor 59 to achieve rapid reset. A pair of NAND gates 61 and 62 is connected in cascade from the resistor 59. The inputs of each NAND gate are connected together, so that each operates as an inverting amplifier. A filtering network 64, including a capacitor and a resistor, is coupled between the B+ supply voltage and the junction of the NAND gates 61 and 62. The output of the NAND gate 62 is coupled by way of a resistor 66 to the output 42, a capacitor 67 being connected between the supply voltage and such output 42.

There is provided a set of electronic switches 47.1–47.8, respectively connected between the taps 46.1–46.8 of the tapped inductor 46 and the B+ supply voltage. The control inputs 41.1–47.8 of the switches 47.1–47.8 are respectively coupled to the logic unit 70, as previously described.

Initially, the input 41.1 is high, and the other inputs 41.2–47.8 are low, whereby electronic switch 47.1 is closed to couple the B+ supply voltage to the tap 46.1. At this time, therefore, the resonant circuit 43 is tuned to a resonant frequency determined by the amount of inductance between the bottom (as viewed in FIG. 2) of the inductor 46 and the tap 46.1, together with the values of the capacitors 44 and 45. If the first tone has a frequency the same as that to which the resonant circuit 43 is then tuned, it will develop a maximum voltage, which is applied to the doubler circuit 53.

The tones, along with the noise, are coupled to the doubler circuit 52 which provides a DC reference voltage. The doubler circuit 53 will rectify the signal furnished by the resonant circuit 43, as long as the peak-to-peak value of such signal exceeds the reference voltage from the doubler circuit 52. The rectified voltage is applied to the base of the transistor 54. Current flows from the B+ supply through the base-emitter junction of the transistor 54 to render it conductive to drive the collector voltage approximately to zero. Such collector voltage is filtered and smoothed by the resistor 59 and the capacitor 63. The zero or low voltage on the collector of the transistor 55 produces a high voltage at the output of the NAND gate 61, which is filtered by the filter network 64. Such high voltage is inverted by the NAND gate 62 to provide a low voltage at the output thereof, which is filtered by the resistor 66 and the capacitor 67. Thus, during the presence of a tone to which the discriminator 40 is then tuned, the voltage on the output 42 will be low, and during the absence of any such tone, the voltage on the output 42 will be high.

As previously described, the logic unit 70 steps when the output 42 becomes high after termination of the previous tone, to cause the output 71.2 (FIG. 1) to become high, the output 71.1 to become low, and the other outputs 71.3–71.8 and 72 to remain low. The high output 71.2 is reflected on the control input 41.2 to close the electronic switch 47.2 and cause the B+ supply voltage to be conducted to the tap 46.2 on the tapped inductor 46. The now low voltage on the input 41.1 removes the B+ supply voltage from the tap 46.1. Accordingly, the resonant circuit 43 has a greater inductance, and therefore a reduced resonant frequency. If the second tone has a frequency equal to such reduced resonant frequency, the output 42 becomes low. Although the embodiment depicted in FIG. 2 indicates that the amount of inductance is increased in the filter 43 for each tone in the sequence, that is merely illustrative.

Thus, each tone is examined by the discriminator 40, and, if it is of the proper frequency, the output 42 will become low for a duration somewhat less than the duration of the tone. Such delay is from the response time of the discriminator 40 to a tone, to prevent falsing in the presence of noise. Moreover, there is a slight delay, on the order of several milliseconds for the output 42 to return to its high state following termination of a tone, due to reaction time of the discriminator 40.

The above-described circuit is merely an example of the frequency discriminator 40 which may be utilized. Alternatively, it may have two tunable filters and alternately operable channels, such as disclosed in U.S. Pat. No. 3,597,690. Such a frequency discriminator can accommodate successive tones of the same frequency and accordingly there will be 100,000,000 ($10^8$) possible tone sequences.

FIG. 3 depicts a representative one of the electronic switches 47.1–47.8. Such switch may include an NPN transistor 48 having its emitter coupled to ground and its base coupled through a resistor 49 to the associated output from the logic unit 70. The collector of the transistor 48 is coupled by way of a resistor 50 to the base of a PNP transistor 51, the emitter of which is coupled to the B+ supply voltage and the collector of which is coupled to the associated tap on the inductor 46. When the associated output of the logic unit 70 becomes high, the transistor 48 will conduct, thereby forward biasing the base-emitter junction of the transistor 51, causing it to conduct and effectively couple the associated tap on the inductor 46 to the B+ supply voltage in parallel with the capacitor 45.

Figure 4:
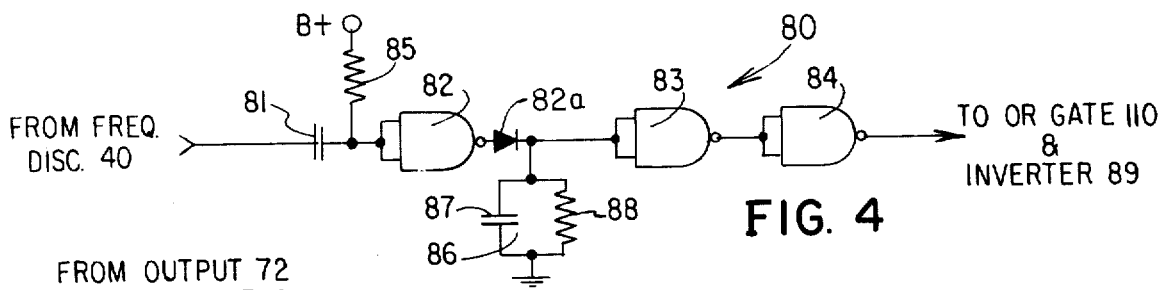
FIG. 4 depicts illustrative circuitry for the reset circuit 80 in FIG. 1.

FIG. 4 depicts a representative reset circuit 80. The frequency discriminator 40 is coupled through a capacitor 81 to three cascaded NAND gates 82, 83 and 84, each having its inputs connected together to function as an inverting amplifier. The NAND gate 82 is connected to the NAND gate 83 by way of a diode 82a. A resistor 85 is connected between the B+ supply voltage and the inputs of the NAND gate 82. A timing network 86, including a capacitor 87 and a resistor 88, is connected in parallel between the junction of the NAND gates 82 and 83 and ground. The reset circuit 80 is a retriggerable monostable multivibrator.

In the absence of any tones or in the absence of tones to which the frequency discriminator 40 is tuned, the input to the reset circuit 80 is high. When a proper tone is received, the output of the frequency discriminator 40 becomes low, causing the output of the NAND gate 82 to become high to charge the capacitor 87. It takes a few milliseconds to charge the capacitor 87 in accordance with the value thereof and with the charging resistance in the NAND gate 82. When the capacitor 87 has been sufficiently charged, the NAND gate 83 is caused to conduct so that its output becomes low, causing the NAND gate 84 to conduct and, therefore, its output to become high. Thus, within a few milliseconds after the first tone is received, the output of the reset circuit 80 becomes high. Upon termination of the tone, the output of the frequency discriminator 40 becomes high, and the capacitor 87 begins to discharge through the resistor 88. If a subsequent tone is received before the capacitor 87 has substantially discharged, the capacitor 87 is recharged and the output of the NAND gate 83 remains low and the output of the NAND gate 84 remains high. If, however, such subsequent tone is not of the correct frequency to operate the frequency discriminator 40, the output thereof remains high, and the capacitor 87 is permitted to discharge to a value whereby the output of the NAND gate 83 becomes high and the output of the NAND gate 84 returns to its normally low state. The diode 82a prevents the capacitor 87 from discharging through the NAND gate 82.

The time constant of the timing network 86 is selected to be greater than the duration of the long tone. If such duration is 40 ms, for example, the time constant of the timing network 86 could be set, for example, for 50 ms. After completion of the eight tones and the reset time period, as determined by the constant of the network 86, the output of the reset circuit 80 becomes low. Also, if any tone in the tone sequence is not intended for the particular receiver 20, the output of the reset circuit 80 will become low after the reset time period following termination of the last correct tone. As previously described, the reset signal, that is, the low output of the reset circuit 80, is inverted by the inverter 89 to provide a high signal to the reset input 74 of the logic unit 70.

Figure 5:
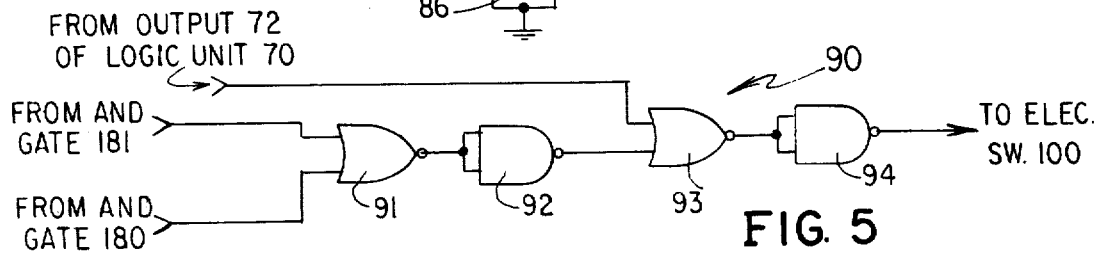
FIG. 5 depicts additional details of the OR gate 90 in FIG. 1.

FIG. 5 depicts further details of the OR gate 90. The OR gate 90 may consist of a NOR gate 91, followed by a NAND gate 92 having its inputs connected together and to the output of the NOR gate 91. A NOR gate 93 has one input connected to the output of the NAND gate 92 and another input connected to the output 72 of the logic unit 70. A NAND gate 94 has its inputs connected together and to the output of the NOR gate 93. Both inputs to the NOR gate 91 are normally low, so that the output thereof is normally high and the output of the NAND gate 92 is normally low. Since the output 72 from the logic unit 70 is also normally low, both inputs to the NOR gate 93 are normally low, and the output thereof is normally high, whereby the output of the NAND gate 94 is normally low. Upon termination of the eighth tone, the output 72 of the logic unit 70 becomes high, as previously described, thereby causing the output of the NAND gate 94 to become high.

The output of the AND gate 180 becomes high when the fifth and sixth tones have long durations. The output of the AND gate 181 becomes high when the fifth and seventh tones have long durations. A high output from either AND gate 180 or 181 causes the output of the NAND gate 94 to become high. The high output of the NAND gate 94 causes the electronic switch to switch, as previously described, which occurs after the reception of all eight tones of proper frequency and proper order, or occurs for group call of one of two different size groups in the embodiment described.

Figure 6:
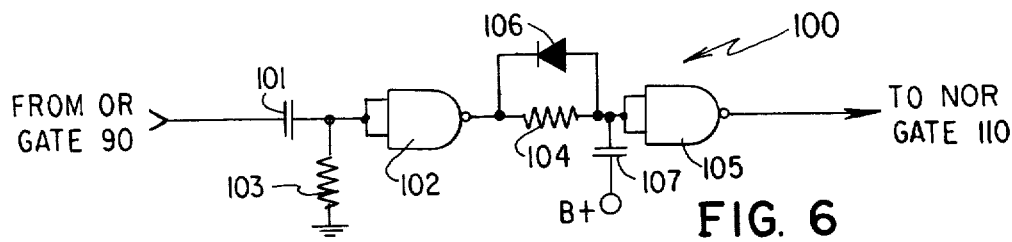
FIG. 6 depicts illustrative circuitry of the electronic switch 100 of FIG. 1.

FIG. 6 illustrates a representative electronic switch 100. Such switch includes a coupling capacitor 101 to a NAND gate 102 having its inputs connected together. A biasing resistor 103 is connected from the inputs of the NAND gate 102 to ground potential. The input to the electronic switch 100 is differentiated by the capacitor 101 and the resistor 103 into a positive spike. A resistor 104 connects the NAND gate 102 to the inputs of a NAND gate 105, the output of which is coupled to the Nor gate 110. A diode 106 shunts the resistor 104, and a timing capacitor 107 is connected from the inputs of the NAND gate 105 to the B+ supply voltage.

The input of the electronic switch 100 is normally low, so that its output is also normally low. When the output of the OR gate 90 becomes high, as the result of all eight tones having been received, or less than eight tones as part of a group call, the output of the NAND gate 102 becomes low to charge the capacitor 107 rapidly through the diode 106. Therefore, the output of the NAND gate 105 rapidly becomes high, on termination of the eighth tone. After a time delay period determined by the resistor 104 and the capacitor 107, the output of the NAND gate 105 returns to its normally low state as the capacitor 107 discharges through the NAND gate 105 and the resistor 104. Such discharge maintains the output of the NAND gate 105 high, after which discharge the output returns to its normally low state. Thus, the time constant of the electronic switch 100, as determined by the resistor 104 and the capacitor 107, controls the duration of an enabling signal (high output) produced by the electronic switch 100. As previously mentioned, the electronic switch 100 could be constructed to have latching means to cause the output thereof to remain high indefinitely, until it is reset.

Figure 7:
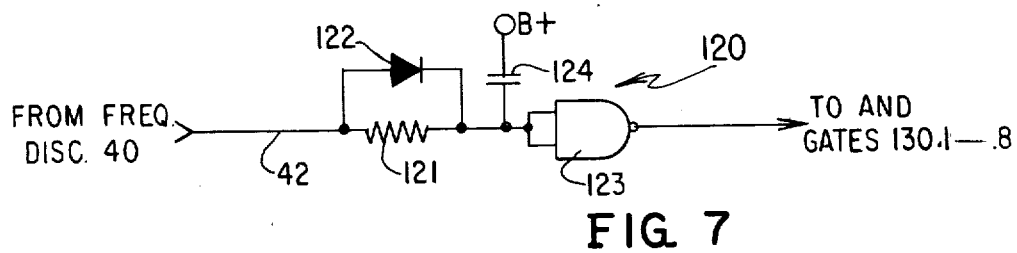
FIG. 7 depicts illustrative circuitry for the duration detector 120 of FIG. 1.

FIG. 7 illustrates a representative circuit for the duration detector 120. It includes a resistor 121 and a diode 122 coupled in parallel from the frequency discriminator 40 to a NAND gate 123, the inputs of which are connected together so as to operate as an inverting amplifier. A capacitor 124 is connected between the supply voltage and the junction between the resistor 121 and the inputs of the NAND gate 123. The input of the duration detector 120 is normally high, so that the output of the NAND gate 123 is normally low. The reception of a tone of a proper frequency causes the output of the frequency discriminator 40 to become low, thereby charging the capacitor 124 through the resistor 121. If the tone has a short duration, the capacitor 124 will not sufficiently charge to switch the NAND gate 123. Accordingly, for a short tone, the output of the duration detector 120 remains low. However, if the tone has a long duration, the capacitor 124 will have sufficient time to charge and switch the NAND gate 123 to cause the output thereof to become high. After termination of a tone, whether short or long, the capacitor 124 is discharged rapidly through the diode 122, so that the duration detector 120 is ready to evaluate the duration of the next tone.

Figure 8:
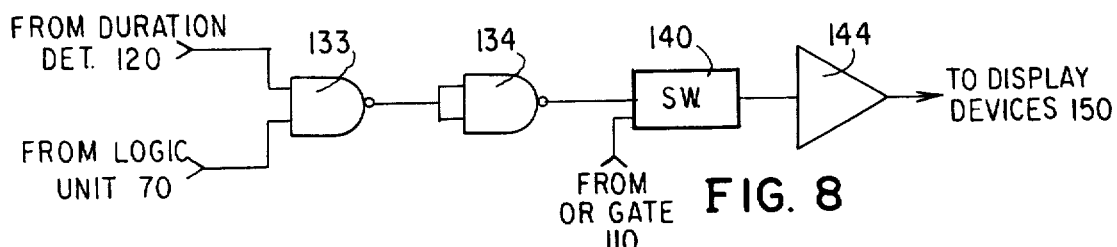
FIG. 8 depicts additional details of the AND gates and switching circuit controlled by the duration detector.

FIG. 8 depicts further details of one of the channels coupled to the display devices 150. Each of the AND gates 130.1–130.8 actually includes NAND gates 133 and 134. The NAND gate 133 has its inputs respectively coupled to the duration detector 120 and the logic unit 70, and the NAND gate 134 has its inputs connected together so as to operate an inverter. The output of the NAND gate 134 is coupled to the associated one of the electronic switches 140.1–140.8, the output of which is, in turn, connected to an amplifier 144. The output of the amplifier 144 is connected to the display device 150.

Figure 9:
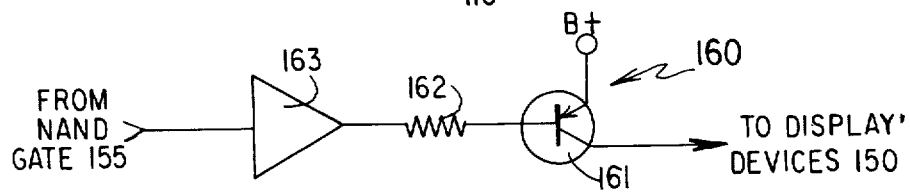
FIG. 9 depicts illustrative circuitry for the power switch 160 of FIG. 1.

FIG. 9 depicts a representative power switch 160. The power switch 160 includes a PNP transistor 161, having its emitter coupled to the B+ voltage and its collector coupled to the display devices 150. Its base is connected through a resistor 162 and an amplifier 163 to the NAND gate 155. The output of the NAND gate 155 is normally high, so the transistor 161 is normally nonconductive. When the output from the NAND gate 155 becomes low in the manner previously described, the transistor 161 becomes conductive to supply power to the display devices 150.

In the above description relative to FIGS. 1 to 9, the switches 140.1–140.8, the NAND gates, the NOR gates, and the amplifiers are well-known devices and readily available on the market. For example, Motorola, Inc. makes a switch like the switches 140.1–140.8 under its designation MC4043, a NOR gate under its designation MC4001, and a NAND gate under its designation MC4011.

Figure 10:
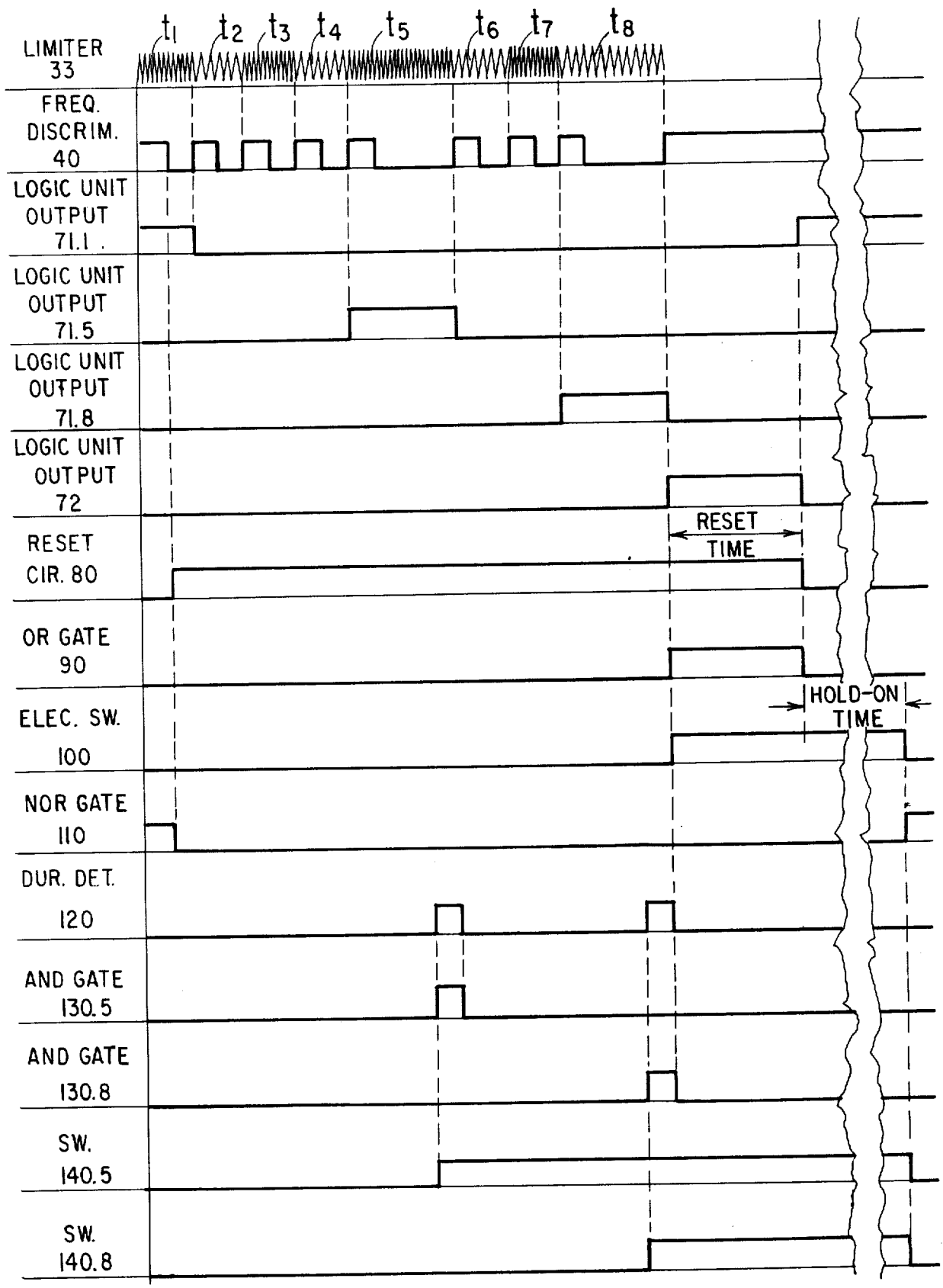
FIG. 10 depicts waveforms at various points in the receiver of FIG. 1 in response to an exemplary set of tones.

FIG. 10 depicts wave forms at various points in the receiver 20 of FIG. 1 and constitutes an example of the manner in which such receiver functions. In the example, it is assumed that a sequence of eight tones $t_1$–$t_8$ has been demodulated by the discriminator 27, and it is assumed that the frequency discriminator 40 is responsive to the tones $t_1$–$t_8$ in that order. It is further assumed that $t_1$–$t_4$, $t_6$ and $t_7$ have short durations, and $t_5$ and $t_8$ have long durations. The output of the frequency discriminator 40 is normally high and becomes low shortly after commencement of the first tone $t_1$. The delay between the time tone $t_1$ starts and the time the output of the frequency discriminator 40 becomes low is the result of built-in delay to prevent falsing. In other words, it is important that the frequency discriminator 40 not react quickly, since it would then respond to noise.

Upon termination of the first tone $t_1$, the output of the frequency discriminator 40 returns to its high state, as shown. If the correct tone $t_2$ follows $t_1$, the output of the frequency discriminator 40 will become low, after the delay period has lapsed. Termination of the second tone $t_2$ results in the output of the frequency discriminator 40 returning to its normally high state. Similarly, the tones $t_3$ and $t_4$ result in similar outputs from the frequency discriminator 40. The tone $t_5$, being one of the long tones, results in a low output from the frequency discriminator 40, after the delay period has lapsed. Such output remains low, however, for a long period of time because of the length of the tone $t_5$. Termination of the tone $t_5$ results in the frequency discriminator output returning to its high state. The short tones $t_6$ and $t_7$ cause the output of the frequency discriminator 40 to be low for the durations shown. The eighth tone $t_8$, being of long duration, causes an output of the frequency discriminator 40 similar to that resulting from the fifth tone, $t_5$. Termination of the eighth tone causes the output of the frequency discriminator 40 to revert to its normally high state preparatory to the next sequence of tones. Thus, the decoded signal on the output 42 indicates the durations of the tones in accordance with the durations of the low states. For convenience in illustration, FIG. 10 depicts the output of the frequency discriminator 40 returning to its high state simultaneously with the termination of the tone. However, in actuality, there is a slight delay between the time a tone ends and the time the output of the frequency discriminator 40 returns to its high state.

The logic unit output 71.1 is normally high, and all the other outputs of the logic unit 70 are normally low, as previously described. The wave forms of the outputs 71.5, 71.8, and 72 are shown for illustrative purposes. Upon termination of the first tone $t_1$, the logic unit 70 steps, so that the output 71.1 becomes low and the output 71.2 becomes high. The output 71.1 will remain low, until the logic unit 70 has been reset, subsequent to completion of the eight tone sequence. Upon termination of the fourth tone, the logic unit output 71.5 becomes high to retune the frequency discriminator 40 to the tone $t_5$. The output 71.5 remains high for the duration of the tone $t_5$, and, upon termination of the tone $t_5$, the logic unit 70 steps, so that the output 71.6 becomes high for the duration of the tone $t_6$. The associated outputs for the other tones, although not shown, will be high for the durations of such tones. On termination of the eighth tone, $t_8$, the output 72 of the logic unit 70 becomes high until the logic unit 70 is later reset.

Shortly after commencement of the first tone, the output of the reset circuit 80, which is normally low, becomes high. The delay is caused by the short time to charge the capacitors in the frequency discriminator 40. Since all of the tones are presumed to be of correct frequency and in the correct order, the output of the reset circuit 80 will remain high, until the end of the "reset time" interval following termination of the eighth tone $t_8$, whereupon the output of the reset circuit 80 returns to its normally low state, preparatory to a later-received tone sequence. Of course, if any of the tones $t_1-t_8$ were not of the correct frequency, the reset time period would commence upon termination of the last correct tone, so that the output of the reset circuit 80 would return to its low state, after such reset time period has lapsed.

The OR gate 90 has a normally low output and becomes high, when the output 72 of the logic unit 70 becomes high, and then reverts to its normally low state when the output 72 becomes low. It should be noted that, if the sequence is part of a group call and either the fifth and sixth tones are long, or the fifth and seventh tones are long, outputs would be provided by the AND gates 180 or 181, which would cause the output of the OR gate 90 to become high at an earlier time.

The output of the electronic switch 100 is normally low and is caused to become high by the output of the OR gate 90 being in its high state. Because of the diode 106 (FIG. 6), the output of the electronic switch 100 becomes high substantially simultaneous with the output of the OR gate 90 becoming high. When the output of the OR gate 90 returns to its low state, the electronic switch 100 commences a hold-on time interval, determined by the time constant of the resistor 104 and the capacitor 107 (FIG. 6). After the hold-on time interval has lapsed, the output of the electronic switch 100 returns to its low state. It should be noted that such hold-on time interval is broken to indicate that a long period of time is contemplated, although such time is variable. For example, such hold-on time interval may be 20 seconds.

The output of the NOR gate 110 is normally high, but will become low in the presence of a high input from the reset circuit 80 or high input from the electronic switch 100. Because the output of the reset circuit 80 becomes high shortly after the first tone commences, the output of the NOR gate 110 becomes low and remains low, as long as either input to the NOR gate 110 is high. Thus, although the output of the reset circuit 80 becomes low, after the reset time interval has lapsed, the output of the electronic switch 100, is high to maintain the output of the NOR gate 110 low. Accordingly, the output of the NOR gate 110 remains low until termination of the hold-on time interval. If any of the tones are incorrect, the output of the electronic switch 100 would not become high at all, and the output of the reset circuit 80 would automatically return to its normally low state following the reset time interval which commences with the termination of the last correct tone. After such reset time interval has lapsed, the output of the NOR gate 110 returns to its normally high state.

The low output of the NOR gate 110, being applied to the reset inputs of the switches 140.1-140.8, allows any of them to be set by a signal applied to the set input thereof.

The duration detector 120 responds to the output of the frequency discriminator 40 being low for longer than a predetermined time. Such predetermined time is greater than the time that the output 42 is low in response to a short tone. thus, during the presence of the tones $t_1-t_4$, the output of the duration detector 120 remains in its normally low state. The duration detector 120 senses that the fifth tone $t_5$ has a long duration, by virtue of the extended time that the output 42 of the frequency discriminator 40 is low. The output of the duration detector 120 becomes high until termination of the fifth tone $t_5$, at which time the output of the duration detector 120 returns to its low state rapidly, by virtue of the rapid discharge through the diode 122 (FIG. 7). Similarly, the output of the duration detector 120 remains low for the short tones $t_6$ and $t_7$, and becomes high for the latter portion of the long tone $t_8$.

The outputs of the AND gates 130.1-130.8 are normally low. For the time the output of the duration detector 120 is high, which high output constitutes one input to the AND gate 130.5, the second input thereto (the logic unit output 71.5) is also high, whereby the output of the AND gate 130.5 is high for the interval shown. Similarly, the output of the AND gate 130.8 becomes high in the presence of the second pulse from the duration detector 120 and the output 71.8 of the logic unit 70. The outputs of the other AND gates 130.1-130.4, 130.6, and 130.7 remain low for the entire duration of the tones $t_1-t_8$, because no pulses appear from the duration detector 120 during such tones.

The output of the switch 140.5 is normally low, but switches to its high state when the output of the AND gate 130.5 becomes high. Similarly, the output of the switch 140.8 is normally low, but switches to its high state when the output of the AND gate 130.8 becomes high. The outputs of the switches 140.5 and 140.8 remain high until the signal applied to the reset inputs thereof from the NOR gate 110 becomes high again, which occurs at the end of the hold-on time determined by the electronic switch 100.

Turning back to FIG. 1, the high output of the electronic switch 100 also causes the power switch 160 to become conductive and thereby supply power to the display devices 150. The high outputs of the switches 140.5 and 140.8 and the low outputs of the switches 140.1–140.4, 140.6, and 140.7 cause the numeral 0 to be displayed on the first display device 150 and the numeral 9 to be displayed on the second display device 150, (see truth table previously described).

Figure 11:
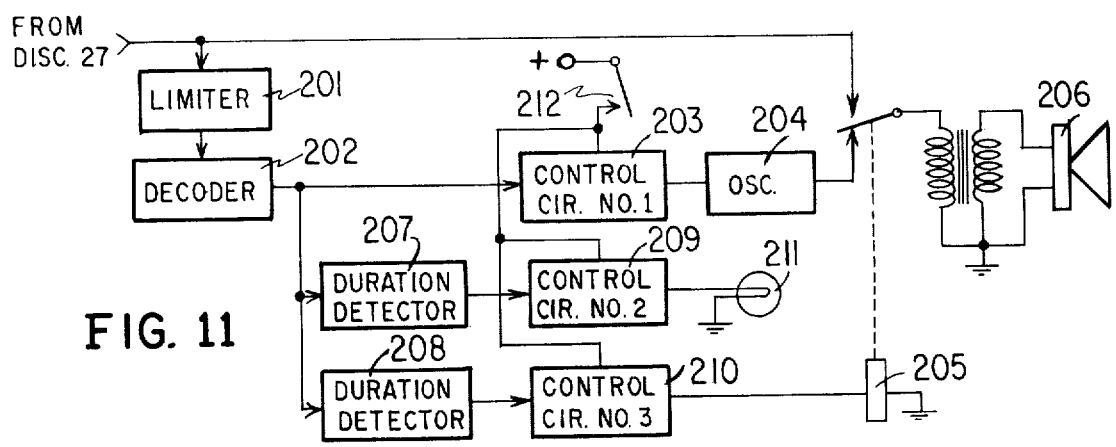
FIG. 11 depicts a block diagram of another embodiment of the present invention.

Turning now to FIG. 11, another embodiment of the invention is illustrated. In this embodiment, the demodulated signal from the discriminator 27 includes one tone alone of selected duration or such tone followed by an audio message. The output of the discriminator 27 is applied to a limiter 201 which increases the amplitude of the demodulated signal and applies the same to a decoder 202. The decoder 202 may be of standard construction and determines whether the tone has the same frequency to which it is tuned. The decoder 202 includes rectification circuitry to provide a DC voltage if the proper tone is detected therein. The DC voltage has a duration which is representative of the duration of the tone. It is contemplated in this embodiment that the tone may have one of three durations and the decoder 202 may produce a high output of a given duration for a short tone, a high output of longer duration for a medium-length tone, and an output of still longer duration for a long tone. A first control circuit 203 responds to any high output of the decoder 202 to provide an enabling signal to render operative an oscillator 204. The oscillator 204 produces an alerting signal which is coupled through the normally closed contacts of a relay 205 to a loudspeaker 206.

The output of the decoder 202 is evaluated by a pair of duration detectors 207 and 208. The duration detector 207 provides a high output for a tone having a duration of at least medium length, while the duration detector 208 provides a high output for a long-duration tone. The duration detectors 207 and 208 are respectively coupled to second and third control circuits 209 and 210. A medium-duration tone causes the output of the duration detector 207 to become high, to cause the second control circuit 209 to provide operating voltage to energize a lamp 211. Such medium-duration tone simultaneously causes an output from the control circuit 203 to cause the oscillator 204 to become operative. Thus, a medium-duration tone produces both visual and audible alerting signals.

A long pulse causes the output of the long-pulse duration detector 208 to become high to cause the third control circuit 210 to supply energizing current to the winding of the relay 205. The relay 205 then assumes its other stable condition to couple the discriminator 27 to the loudspeaker 206, thereby coupling the ensuing audio message thereto. The energization of the relay 205 also opens the normally closed contacts of the relay 205 to prevent the alerting signal produced by the oscillator 204 from being coupled to the loudspeaker 206.

The long tone causes an output, not only from the duration detector 208, but also from the duration detector 207, since it has a duration exceeding the medium duration to which the detector 207 responds. Thus, transmitting a tone of long duration to enable the receiver to respond to a voice message will also illuminate the lamp 211 to apprise the bearer of the ensuing voice message.

A reset switch 212 is provided for manually causing the outputs of the control circuits 203, 209, and 210 to revert to their normally low states. Alternatively, each of such control circuits could include timing means, so that the output thereof remains high for a predetermined limited duration following termination of the tones.

Figure 12:
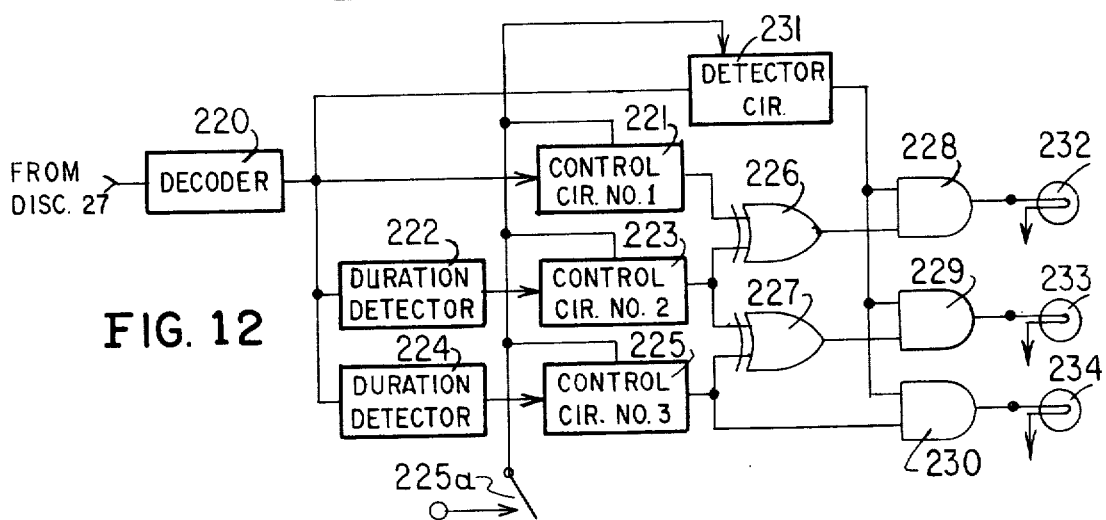
FIG. 12 illustrates a block diagram of another embodiment of the present invention.

FIG. 12 illustrates a further embodiment of the present invention. In this particular embodiment the incoming signal does not contain voice, but does contain a tone of selected duration. Such tone may have a short duration, a medium duration, or a long duration, in the sense that those terms have been previously discussed. If the signal from the discriminator 27 contains the tone to which a decoder 220 is tuned, its output will become high for a duration representing the duration of the tone. The output from the decoder 220 causes the output from a first control circuit 221 to become high. The control circuit 221 includes latching means, so that the output thereof is maintained in its high state following termination of the tone. If the tone has a duration at least of medium length, it will be sensed by a duration detector 222, the output of which will become high. A second control circuit 223 will provide a high output in response to an output of the duration detector 222. A second duration detector 224 is responsive only to long-duration tones, in the presence of which it will supply a high output for operating a third control circuit 225 to produce a high output. The control circuits 221, 223, and 225 include latching means to cause the high outputs to persist for an indefinite time following termination of the tones.

A reset switch 225a enables resetting of the outputs of the control circuits 221, 223, and 225 to their low states. In this embodiment, too, the latching means could be replaced with timing means.

The outputs of the control circuits 221 and 223 are coupled respectively to the two inputs of an exclusive OR gate 226, and the outputs of the control circuits 223 and 225 are coupled respectively to the inputs of a second exclusive OR gate 227. The output of an exclusive OR gate is low, when both inputs are either low or high; its output will be high, when one input is high and when one input is low. If the tone has a short duration, the first control circuit 221 has a high output, while the control circuits 223 and 225 have low outputs, so that only the output of the exclusive OR gate 226 becomes high. If the tone has a medium duration, the outputs of both control circuits 221 and 223 become high, and, therefore, the exclusive OR gate 226 output remains low. The high output of the control circuit 223 and the low output of the control circuit 225 cause the exclusive OR gate 227 to switch and provide a high output. In the case of a long duration pulse, all three control circuits 221, 223, and 225 have high outputs. The two high inputs to the exclusive OR gate 226 cause its output to remain low, and the two high inputs to the exclusive OR gate 227 cause its output to remain low.

The exclusive OR gates 226 and 227, are respectively coupled to AND circuits 228 and 229, while the third control circuit 225 is coupled directly to a third AND gate 230. In the presence of a short-duration tone, the first input to the AND gate 228 is high, and the corresponding inputs to the AND gates 229 and 230 remain low. In the presence of a medium-duration tone, the first input to the AND gate 229 is high, while the corresponding inputs of the AND gates 228 and 230 remain low. If the tone has a long duration, the first input of the AND gate 230 is high, and the corresponding inputs of the AND gates 228 and 229 remain low.

There is also provided a detector circuit 231 which responds to termination of the tone from the decoder 220. On termination of the tone, the output of the detector circuit 231 becomes high and provides a second input to the AND gates 228, 229, and 230. If the tone has a short duration, the high inputs to the AND gate 228 cause its output to become high upon termination of the tone. If the tone has a medium duration, the high output from the exclusive OR gate 227, in conjunction with the high output of the detector circuit 231, causes the output of the AND gate 229 to become high upon termination of the tone. If the tone has a long duration, the high output of the control circuit 225, in conjunction with the high output from the detector circuit 231 on termination of the tone, causes the AND gate 230 to become high. Preferably the detector circuit 231 is of the latching variety, that is, upon termination of a tone its output remains high indefinitely. Accordingly, the reset switch 225a is connected to the detector circuit 231, as shown. When the switch 225a is actuated to reset the control circuit 221, 223, and 225, it also resets the detector circuit 231.

The AND gates 228, 229, and 230 are connected respectively to lamps 232, 233, and 234, which lamps are representative of utilization means for the high outputs of the AND gates. A short tone will cause illumination of the lamp 232; a medium duration tone will energize the lamp 233; and a long duration tone will cause energization of the lamp 234. The lamps 232, 233, and 234 represent any device which is to be remotely controlled, such as traffic lights. etc. By controlling the frequency of the tone, a specific receiver can be selected; by controlling the duration of the tone, specific control functions furnished by such receiver can be selected. Of course, the principle of the embodiment of FIG. 12 can be expanded to more durations and/or a sequence of tones.

Figure 13:
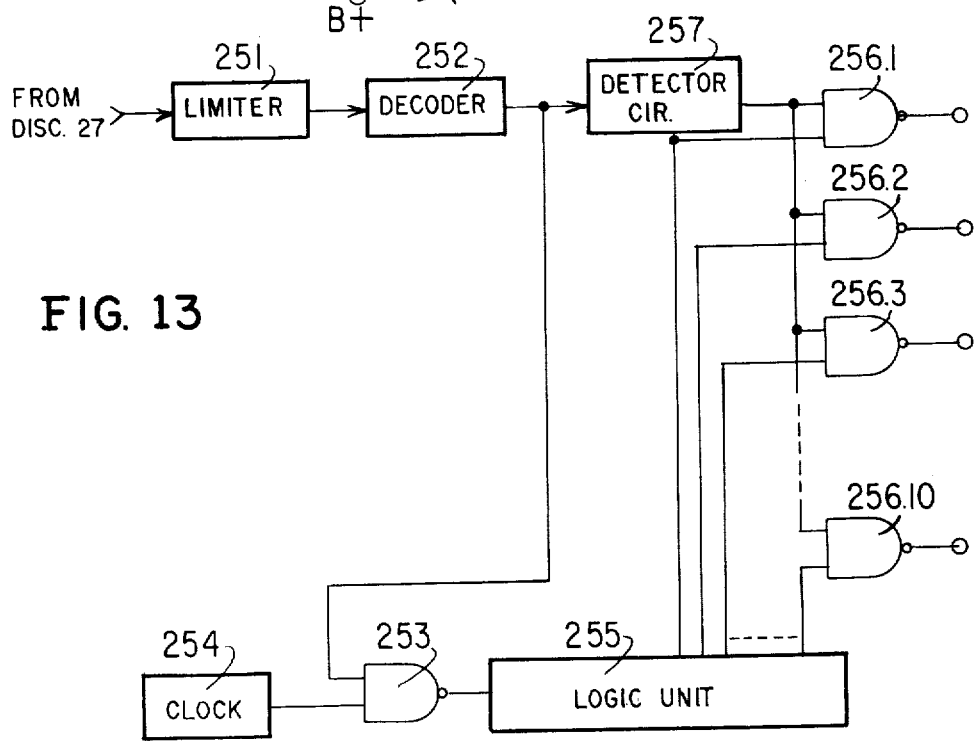
FIG. 13 depicts a block diagram of another embodiment of the present invention.

FIG. 13 depicts a further embodiment of the present invention. The demodulated signal from the discriminator 27 includes at least one tone. The output of the discriminator 27 is applied to a limiter 251, which increases the amplitude of the demodulated signal and applies the same to a decoder 252. The decoder 252 evaluates the tone, to determine whether it has a predetermined frequency. The decoder 252 includes rectification circuitry to provide a DC voltage if the proper tone is identified therein. The DC voltage has a duration which is representative of the duration of the tone. It is contemplated in this embodiment that the tone may have one of a plurality of durations. As an example, it is assumed that the tone can have one of 10 durations, the duration $D_1$ being the shortest and the duration $D_{10}$ being the longest.

The output of the decoder 252 is applied to an NAND gate 253, the second input to which is derived from a clock 254. The clock 254 produces a train of pulses at a predetermined rate. If the tone has a duration $D_1$, the decoder 252 will produce a short DC voltage which will be in time coincidence with the first pulse produced by the clock 254, so that the NAND gate 253 produces a single pulse. The rate of the clock 254 is such that the second pulse produced thereby will occur after the termination of the DC voltage from the decoder 252 and thus will cause no further pulse from the NAND gate 253.

If the tone has a duration $D_2$, the duration of the DC voltage produced by the decoder 252 is increased, and the rate of pulses produced by the clock 254 is such that two pulses therefrom will occur in time coincidence with the DC voltage from the decoder 252. The DC voltage will have terminated by the time the third pulse from the clock 254 appears. Accordingly, the output of the NAND gate 253 will be a train of two pulses. A similar analysis may be made in respect to a tone of each of the 10 durations.

Summarizing, a tone with a duration $D_1$ will cause the NAND gate 253 to produce one pulse; if it has a duration $D_2$, the NAND gate 253 will produce a train of two pulses, etc., and a tone with a duration $D_{10}$ will produce a train of 10 pulses.

The NAND gate 253 is coupled to a logic unit 255 having a construction similar to the logic unit 70 in the first embodiment. The logic unit 255 has 10 outputs (four are shown) respectively coupled to 10 NAND gates, four of which NAND gates 256.1-256.3 and 256.10 are shown. A single pulse from the NAND gate 253 resulting from a tone having a duration $D_1$ produces a single pulse and causes the first output of the logic unit 255 to become high, thereby furnishing one input to the NAND gate 256.1. If the NAND gate 253 produces two pulses as the result of the tone having a duration $D_2$, the logic unit 255 steps to the next output which becomes high and therefore provides one input to the NAND gate 256.2. Following through with the analysis, only the NAND gate 256.1 will receive an input for a tone having a duration $D_1$; only the NAND gate 256.2 will receive an input having a duration $D_2$, etc.

There is also provided a detector circuit 257 which provides a second input to all the NAND gates 256.1-256.10 upon termination of the tone. Accordingly, the NAND gate corresponding to the duration of the tone received produces an output. The outputs from the NAND gates 256.1-256.10 may be used to control a selected system.

It is believed that the invention, its mode of construction and assembly, and many of its advantages should be readily understood from the foregoing without further description, and it should also be manifest that, while preferred embodiments of the invention have been shown and described for illustrative purposes, the structural details are, nevertheless, capable of wide variation within the purview of the invention, as defined by the appended claims.

What is claimed is:

1. In a selectively callable receiver having means to furnish a plurality of tones, the combination comprising decoding means responsive to tones respectively of predetermined frequencies for producing a decoded signal indicative of the durations respectively of the tones, said decoding means having an enabling output for providing an enabling signal in response to reception of all of the tones, duration-detecting means coupled to said decoding means and responsive to said decoded signal for providing a detected signal having properties indicative of the durations of the tones, and annunciating means coupled to said enabling output and being rendered operative by said enabling signal, said annunciating means being further coupled to said detecting means for expressing information in accordance with the properties of said detected signal.

2. In the selectively callable receiver of claim 1, wherein said decoded signal is a train of pulses having durations respectively representative of the durations of the tones.

3. In the selectively callable receiver of claim 1, wherein said decoding means includes means to cause said enabling signal to commence with the termination of the last tone in the plurality of tones.

4. In the selectively callable receiver of claim 1, wherein said detecting means includes timing means for causing said detected signal to include pulses in response to detected pulses in said detected signal exceeding a predetermined duration.

5. In the selectively callable receiver of claim 1, wherein the combination further comprises power-switching means for coupling a supply voltage to said annunciating means, said switching means being coupled to said decoding means and being rendered operative by said enabling signal to supply power to said annunciating means.

6. In a selectively callable receiver having means to furnish a sequence of a plurality of tones, the combination comprising frequency-discriminating means tunable to a plurality of frequencies and having a plurality of control inputs for sequentially receiving signals to tune said discriminating means sequentially to said plurality of frequencies, said discriminating means being sequentially responsive to the sequence of tones applied thereto for producing a sequence of pulses with durations respectively representative of the durations of the tones, logic means coupled to said discriminating means and having an enabling output and a plurality of control outputs, said logic means being responsive to the pulses from said discriminating means for sequentially producing control pulses respectively on said control outputs and an enabling signal on said enabling output, said control pulses being respectively applied to the control inputs of said discriminating means to tune said discriminating means sequentially to said plurality of frequencies, duration-detecting means coupled to said discriminating means and responsive to those pulses therefrom having predetermined durations to provide corresponding pulses, a plurality of AND means respectively having first inputs respectively coupled to the control outputs of said logic means and respectively having second inputs coupled to said detecting means, each of said AND means being responsive to the concurrence of pulses on the first and second inputs thereof for producing an AND signal, and annunciating means coupled to said enabling output and being rendered operative by said enabling signal, said annunciating means being further coupled to said AND means for expressing information in accordance with said AND signals.

7. In the selectively callable receiver of claim 6, wherein said frequency-discriminating means includes filter means to pass a tone at the frequency to which said filter means is tuned, and rectifying means coupled to said filter means for rectifying the tone passed thereby.

8. In the selectively callable receiver of claim 6, wherein said duration-detecting means includes timing means to provide said corresponding pulses in response to those pulses from said discriminating means exceeding a predetermined duration.

9. In the selectively callable receiver of claim 6, wherein the combination further comprises reset means coupled to said frequency-discriminating means and responsive to the absence of pulses therefrom for a predetermined interval for producing a reset signal, said logic means being coupled to said reset means and being conditioned by said reset signal to receiver pulses resulting from a subsequent sequence of tones.

10. In a selectively callable receiver having means to furnish a plurality of tones, the combination comprising decoding means responsive to tones respectively of predetermined frequencies for producing a decoded signal indicative of the durations respectively of the tones, said decoding means having an enabling output for providing an enabling signal in response to reception of all of the tones, duration-detecting means coupled to said decoding means and responsive to said decoded signal for providing a detected signal having properties indicative of the durations of the tones, electronic-switching means coupled to said enabling output and responsive to said enabling signal for providing a switched signal persisting after termination of the tones, and annunciating means coupled to said switching means and being rendered operative by said switched signal, said annunciating means being further coupled to said detecting means for expressing information in accordance with the properties of said detected signal.

11. In the selectively callable receiver of claim 10, wherein said electronic-switching means includes timing means to cause said switched signal to persist for a predetermined limited duration after termination of the tones.

12. In the selectively callable receiver of claim 10, wherein said electronic switching means includes latching means to cause said switched signal to persist indefinitely after termination of the tones, and a reset switch to disrupt said switched signal.

13. In a selectively callable receiver having means to furnish a sequence of a plurality of tones, the combination comprising frequency-discriminating means tunable to a plurality of frequencies and having a plurality of control inputs for sequentially receiving signals to tune said discriminating means sequentially to said plurality of frequencies, said discriminating means being sequentially responsive to the sequence of tones applied thereto for producing a sequence of pulses with durations respectively representative of the durations of the tones, logic means coupled to said discriminating means and having an enabling output and a plurality of control outputs, said logic means being responsive to the pulses from said discriminating means for sequentially producing control pulses respectively on said control outputs and an enabling signal on said enabling output, said control pulses being respectively applied to the control inputs of said discriminating means to tune said discriminating means sequentially to said plurality of frequencies, duration-detecting means coupled to said discriminating means and responsive to those pulses therefrom having predetermined durations to provide corresponding pulses, a plurality of AND means respectively having first inputs respectively coupled to the control outputs of said logic means and respectively having second inputs coupled to said detecting means, each of said AND means being responsive to the concurrence of pulses on the first and second inputs thereof for producing an AND signal, a plurality of electronic first switching means respectively coupled to said AND means and responsive to said AND signals for providing first switched signals persisting after termination of the tones, electronic second switching means coupled to said enabling output and responsive to said enabling signal for providing a second switched signal persisting after termination of the tones, annunciating means coupled to said second switching means and being rendered operative by said second switched signal, and said annunciating means being further coupled to said first switching means for expressing information in accordance with said first switched signals.

14. In the selectively callable receiver of claim 13, wherein said electronic first switching means includes latching means to cause said first switched signals to persist indefinitely after termination of the tones, and reset means for manually disrupting said first switched signal.

15. In the selectively callable receiver of claim 13, wherein said combination further comprises reset means coupled to said frequency-discriminating means and responsive to the absence of pulses therefrom for a predetermined interval for producing a reset signal, said logic means being coupled to said reset means and being conditioned by said reset signal to receive pulses resulting from a subsequent set of tones, said electronic first switching means being coupled to said reset means and being conditioned by said reset signal to receive AND signals resulting from a subsequent sequence of tones.

16. In a selectively callable receiver having means to furnish at least one tone alone or at least one tone followed by an audio message, the combination comprising decoding means responsive to a tone of predetermined frequency for producing a decoded signal indicative of the duration of the tone, duration-detecting means coupled to said decoding means and responsive to said decoded signal for producing a detected signal having properties indicative of the duration of the tone, audio means for processing the audio message and converting it into an audible message, said audio means being coupled to said detecting means for being rendered operative only in the presence of a detected signal having predetermined properties, and alerting means coupled to said detecting means for producing an alerting signal in response to a detected signal having other predetermined properties.

17. In the selective callable receiver of claim 16, wherein said alerting means produces an audible alerting signal.

18. In the selectively callable receiver of claim 16, wherein said detecting means includes timing means for providing said detected signal when said decoded signal exceeds a predetermined duration.

19. In a selectively callable receiver having means to furnish a plurality of tones alone or a plurality of tones followed by an audio message, the combination comprising decoding means responsive to the tones respectively of predetermined frequencies for producing a decoded signal indicative of the durations of the tones, duration-detecting means coupled to said decoding means and responsive to said decoded signal for providing a detected signal having properties indicative of the durations of the tones, audio means for processing the audio message and converting it into an audible message, said audio means being coupled to said detecting means for being rendered operative only in the presence of a detected signal having predetermined properties, and alerting means coupled to said detecting means for producing an alerting signal in response to a detected signal having other predetermined properties.

20. In the selectively callable receiver of claim 19, wherein said decoded signal is a train of pulses having durations respectively representative of the durations of the tones.

21. In the selectively callable receiver of claim 19, wherein said detecting means includes timing means for causing said detected signal to include pulses in response to detected pulses in said detected signal exceeding a predetermined duration.

22. In a selectively callable receiver having means to furnish a plurality of tones alone or a plurality of tones followed by an audio message, the combination comprising decoding means responsive to the tones respectively of predetermined frequencies for producing a decoded signal indicative of the durations of the tones, said decoding means having an enabling output for providing an enabling signal in response to reception of all of the tones, duration-detecting means coupled to said decoding means for providing a detected signal in response to a decoded signal having predetermined properties, first AND means having inputs coupled respectively to said enabling output and to said detecting means and responsive to the concurrence of said enabling signal and said detected signal for producing a first AND signal, second AND means having inputs respectively coupled to said enabling output and to the output of said first AND means and responsive to the presence of said enabling signal and the absence of said first AND signal for producing a second AND signal, audio means for processing the audio message and converting it into an audible message, said audio means being coupled to one of said AND means for being rendered operative in the presence of the associated AND signal, and alerting means coupled to the other of said AND means for producing an alerting signal in the presence of the associated AND signal.

23. In the selective callable receiver of claim 22, wherein each of said AND means includes a NAND gate.

24. In a selectively callable receiver having means to furnish at least one tone alone or at least one tone followed by an audio message, the combination comprising decoding means responsive to a tone of predetermined frequency for producing a decoded signal indicative of the duration of the tone, duration-detecting means coupled to said decoding means and responsive to said decoded signal for producing a detected signal having properties indicative of the duration of the tone, audio means for processing the audio message and converting it into an audible message, said audio means being coupled to said detecting means for being rendered operative only in the presence of a detected signal having predetermined properties, and annunciating means coupled to said detecting means for expressing information in accordance with other predetermined properties of said detected signal.

25. In the selectively callable receiver of claim 24, wherein said decoded signal includes a pulse having a duration representative of the duration of the tone.

26. In the selectively callable receiver of claim 24, wherein said detecting means includes timing means for providing said detected signal when said decoded signal exceeds a predetermined duration.

27. In the selectively callable receiver of claim 24, wherein said annunciating means includes means visually to display the information.

28. In the selectively callable receiver of claim 24, wherein said annunciating means includes digital-readout apparatus for expressing the information in the form of digits.

29. In a selectively callable receiver having means to furnish a plurality of tones alone or a plurality of tones followed by an audio message, the combination comprising decoding means responsive to the tones respectively of predetermined frequencies for producing a decoded signal indicative of the durations of the tones, said decoding means having an enabling output for providing an enabling signal in response to reception of all of the tones, duration-detecting means coupled to said decoding means and responsive to said decoded signal for providing a detected signal having properties indicative of the durations of the tones, audio means for processing the audio message and converting it into an audible message, said audio means being coupled to said detecting means for being rendered operative only in the presence of a detected signal having predetermined properties, and annunciating means coupled to said enabling output and being rendered operative by said enabling signal, said annunciating means being further coupled to said detecting means for expressing information in accordance with other predetermined properties of said detected signal.

30. In the selectively callable receiver of claim 29, wherein said decoded signal is a train of pulses having durations respectively representative of the durations of the tones.

31. In the selectively callable receiver of claim 29, wherein said decoding means includes means to cause said enabling signal to commence with the termination of the last tone in the plurality of tones.

32. In the selectively callable receiver of claim 29, wherein said detecting means includes timing means for causing said detected signal to include pulses in response to detected pulses in said detected signal exceeding a predetermined duration.

33. In the selectively callable receiver of claim 29, wherein the combination further comprises power-switching means for coupling a supply voltage to said annunciating means, said switching means being coupled to said decoding means and being rendered operative by said enabling signal to supply power to said annunciating means.

34. In a selectively callable receiver having means to furnish at least one tone alone or at least one tone followed by an audio message, the combination comprising frequency-discriminating means tunable to a plurality of frequencies and having a plurality of control inputs for sequentially receiving signals to tune said discriminating means sequentially to said plurality of frequencies, said discriminating means being sequentially responsive to the sequence of tones applied thereto for producing a sequence of pulses with durations respectively representative of the durations of the tones, logic means coupled to said discriminating means and having an enabling output and a plurality of control outputs, said logic means being responsive to the pulses from said discriminating means for sequentially producing control pulses respectively on said control outputs and an enabling signal on said enabling output, said control pulses being respectively applied to the control inputs of said discriminating means to tune said discriminating means sequentially to said plurality of frequencies, duration-detecting means coupled to said discriminating means and responsive to those pulses therefrom having predetermined durations to provide corresponding pulses, a plurality of AND means respectively having first inputs respectively coupled to the control outputs of said logic means and respectively having second inputs coupled to said detecting means, each of said AND means being responsive to the concurrence of pulses on the first and second inputs thereof for producing an AND signal, audio means for processing the audio message and converting it into an audible message, said audio means being coupled to said AND means for being rendered operative only in the presence of predetermined ones of said AND signals, and annunciating means coupled to said enabling output and being rendered operative by said enabling signal, said annunciating means being further coupled to said AND means for expressing information in accordance with the presence of others of said AND signals.

35. In the selectively callable receiver of claim 34, wherein said frequency-discriminating means includes filter means to pass a tone at the frequency to which said filter means is tuned, and rectifying means coupled to said filter means for rectifying the tone passed thereby.

36. In the selectively callable receiver of claim 34, wherein said duration-detecting means includes timing means to provide said corresponding pulses in response to those pulses from said discriminating means exceeding a predetermined duration.

37. In the selectively callable receiver of claim 34, wherein the combination further comprises reset means coupled to said frequency-discriminating means and responsive to the absence of pulses therefrom for a predetermined interval for producing a reset signal, said logic means being coupled to said reset means and being conditioned by said reset signal to receive pulses resulting from a subsequent sequence of tones.

38. In a selectively callable receiver having means to furnish a plurality of tones alone or a plurality of tones followed by an audio message, the combination comprising decoding means responsive to the tones respectively of predetermined frequencies for producing a decoded signal indicative of the durations of the tones, said decoding means having an enabling output for providing an enabling signal in response to reception of all of the tones, duration-detecting means coupled to said decoding means for providing a detected signal in response to a decoded signal having predetermined properties, first AND means having inputs coupled respectively to said enabling output and to said detecting means and responsive to the concurrence of said enabling signal and said detected signal for producing a first AND signal, second AND means having inputs respectively coupled to said enabling output and to the output of said first AND means and responsive to the presence of said enabling signal and the absence of said first AND signal for producing a second AND signal, audio means for processing the audio message and converting it into an audible message, said audio means being coupled to one of said AND means for being rendered operative in the presence of the associated AND signal, and annunciating means coupled to the other of said AND means and being rendered operative by the associated AND signal, said annunciating means being further coupled to said detecting means for expressing information in accordance with the properties of said detected signal.

39. In a selectively callable receiver having means to furnish a plurality of tones, the combination comprising decoding means responsive to tones respectively of predetermined frequencies for producing a decoded signal indicative of the durations respectively of the tones, said decoding means having an enabling output for providing an enabling signal in response to reception of all of the tones, duration-detecting means coupled to said decoding means and responsive to said decoded signal for providing a detected signal having properties indicative of the duration of the tones, group-call circuit means coupled to said decoding means and responsive to fewer than all of the tones to provide a group-call signal, OR means having a first input coupled to said enabling output of said decoding means and a second input coupled to said group-call circuit means and being responsive to the presence of either said enabling signal or said group-call signal to provide an OR signal, and annunciating means coupled to said OR means and being rendered operative by said OR signal, said annunciating means being further coupled to said detecting means for expressing information in accordance with predetermined properties of said detected signal.

40. In the selectively callable receiver of claim 39, wherein said group-call circuit means includes first means to provide said group-call signal in response to a first predetermined number of fewer tones, and second means to provide said group-call signal in response to a second predetermined number of fewer tones, and said annunciating means expressing information as to which predetermined number of tones has been received.

41. In a selectively callable receiver having means to furnish a sequence of a plurality of tones, the combination comprising frequency-discriminating means tunable to a plurality of frequencies and having a plurality of control inputs for sequentially receiving signals to tune said discriminating means sequentially to said plurality of frequencies, said discriminating means being sequentially responsive to the sequence of tones applied thereto for producing a sequence of pulses with durations respectively representative of the durations of the tones, logic means coupled to said discriminating means and having an enabling output and a plurality of control outputs, said logic means being responsive to the pulses from said discriminating means for sequentially producing control pulses respectively on said control outputs and an enabling signal on said enabling output, said control pulses being respectively applied to the control inputs of said discriminating means to tune said discriminating means sequentially to said plurality of frequencies, duration-detecting means coupled to said discriminating means and responsive to those pulses therefrom having predetermined durations to provide corresponding pulses, a plurality of AND means respectively having first inputs respectively coupled to the control outputs of said logic means and respectively having second inputs coupled to said detecting means, each of said AND means being responsive to the concurrence of pulses on the first and second inputs thereof for producing an AND signal, a plurality of electronic first switching means respectively coupled to said AND means and responsive to said AND signals for providing first switched signals persisting after termination of the tones, group-call circuit means coupled to selected ones of said first switching means and responsive to the first switched signals therefrom to provide a group-call signal, OR means having a first input coupled to said enabling output of said logic means and a second input coupled to said group-call circuit means and being responsive to the presence of either said enabling signal or said group-call signal to provide an OR signal, electronic second switching means coupled to said OR means and responsive to said OR signal for providing a second switched signal persisting after termination of the tones, annunciating means coupled to said second switching means and being rendered operative by said second switched signal, and said annunciating means being further coupled to said first switching means for expressing information in accordance with said first switched signals.

42. In the selectively callable receiver of claim 41, and further comprising reset means coupled to said discriminating means and being responsive to the absence of a tone for a predetermined time to provide a reset signal, further OR means having a first input coupled to said reset means and a second input coupled to said electronic first switching means and being responsive to the presence of either said reset signal or said first switched signal to provide a further OR signal, said electronic second switching means being coupled to said further OR means and being rendered operative only in the absence of said further OR signal.

43. In the selective callable receiver of claim 41, wherein said group-call circuit means includes first means coupled to at least one of said electronic first switching means to provide said group-call signal in response to a first predetermined number of tones fewer than all of said tones, second means coupled to another of said electronic first switching means to provide said group-call signal in response to a second predetermined number of tones fewer than said first predetermined number.

44. In a selectively callable receiver having means to furnish a plurality of tones alone or a plurality of tones followed by an audio message, the combination comprising, decoding means responsive to the tones respectively of predetermined frequencies for producing a decoded signal indicative of the durations of the tones, said decoding means having an enabling output for providing an enabling signal in response to reception of all of the tones, duration-detecting means coupled to said decoding means and responsive to said decoded signal for providing a detected signal having properties indicative of the durations of the tones, group-call circuit means coupled to said decoding means and responsive to fewer than all of the tones to provide a group-call signal, audio means for processing the audio message and converting it into an audible message, said audio means being coupled to said detecting means for being rendered operative only in the presence of a detected signal having predetermined properties, OR means having a first input coupled to said enabling output of said decoding means and a second input coupled to said group-call circuit means being responsive to the presence of either said enabling signal or said group-call signal to provide an OR signal, annunciating means coupled to said OR means and being rendered operative by said OR signal, said annunciating means being further coupled to said detecting means for expressing information in accordance with other predetermined properties of said detected signal.

45. In a selectively callable receiver having means to furnish a plurality of tones, the combination comprising decoding means responsive to tones respectively of predetermined frequencies for producing a decoded signal indicative of the durations respectively of the tones, and duration-detecting means coupled to said decoding means and having a plurality of outputs, said detecting means being responsive to said decoded signal for providing signals on said outputs in accordance with the durations of the tones.

46. In a selectively callable receiver having means to furnish a coded signal including a plurality of tones, the combination comprising first circuit means responsive to a coded signal of predetermined frequencies for producing a first output signal having properties indicative of said frequencies, second circuit means responsive to the durations of the tones of said coded signal for providing a second output signal having properties indicative of said durations, and annunciating means coupled to said second circuit means for expressing information in accordance with the properties of said second output signal.

47. In a selectively callable receiver having means to furnish a coded signal including a plurality of tones, the combination comprising first circuit means responsive to a coded signal of predetermined frequencies for producing an output signal having properties indicative of such frequencies, and second circuit means having a plurality of outputs associated with a plurality of durations of the tones in said coded signal, said second circuit means being responsive to said output signal for providing signals on said outputs in accordance with said durations.

* * * * *